US008171455B2

(12) United States Patent
Fay (10) Patent No.: US 8,171,455 B2
(45) Date of Patent: May 1, 2012

(54) TEST SEQUENCER AND METHOD FOR MANAGEMENT AND EXECUTION OF SEQUENCE ITEMS

(75) Inventor: Thomas R. Fay, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1356 days.

(21) Appl. No.: 10/917,869

(22) Filed: Aug. 13, 2004

(65) Prior Publication Data

US 2006/0036392 A1 Feb. 16, 2006

(51) Int. Cl.
*G06F 9/44* (2006.01)
(52) U.S. Cl. ........................ 717/124; 717/120; 717/106
(58) Field of Classification Search ........................ None
See application file for complete search history.

(56) References Cited

U.S. PATENT DOCUMENTS

| | | | |
|---|---|---|---|
| 5,557,539 A * | 9/1996 | Fitch | 709/206 |
| 6,002,869 A * | 12/1999 | Hinckley | 717/124 |
| 6,282,527 B1 * | 8/2001 | Gounares et al. | 706/13 |
| 6,542,841 B1 * | 4/2003 | Snyder | 702/104 |
| 6,775,824 B1 | 8/2004 | Osborne, II et al. | |
| 7,000,224 B1 * | 2/2006 | Osborne et al. | 717/125 |
| 7,210,087 B2 * | 4/2007 | Mukai et al. | 714/742 |
| 2005/0022194 A1 * | 1/2005 | Weir et al. | 718/100 |

FOREIGN PATENT DOCUMENTS

DE 19530095 2/1997

* cited by examiner

*Primary Examiner* — Li Zhen
*Assistant Examiner* — Evral Bodden (57) ABSTRACT

A test sequencer software application and method for management and execution of sequence items. The test sequencer software application includes a management module and an execution module. The management module has capabilities of obtaining multiple sequence items definitions, of obtaining configuration information, of creating multiple lists of ordered sequence items from the sequence items definitions, and of separately linking each list of sequence items to one of multiple sequence engines from the configuration information. The execution module includes a sequencer controller module and the multiple sequence engines. The sequence controller module activates each of the multiple sequence engines in a preselected order and each sequence engine executes the ordered sequence items in each list linked to that sequence engine.

21 Claims, 6 Drawing Sheets

TEST SEQUENCER AND METHOD FOR MANAGEMENT AND EXECUTION OF SEQUENCE ITEMS

BACKGROUND

Test and measurement is an important part of modem product development and manufacture. The instruments that perform these tests can typically be automated to perform a number of selected tests. These tests are executed under various conditions on numerous systems or components. The number of items performed by any test sequence depends upon whether the product is still under development or in production, as well as the size of the market for those items in production.

A few basic test techniques are used when controlling a test by an instrument from a computer. One technique is to employ a test program. This technique results in a hand coded program which is inflexible and which is time consuming to change as products change and testing strategies evolve. This technique also requires a level of programming skill which the typical hardware developer does not usually have. This can further increase the time to effect a program change, add to the complexity of creating and verifying test changes, and increase the cost of such a change.

Another technique is to use an interactive soft front panel that provides the user a virtual front panel of the instrument from a computer. However, if this technique is used, typically none of the testing steps are remembered by the computer. No test automation occurs, the user merely uses the computer for control of the instrument. While useful as an exploratory tool, it is ineffective when the test must be repeated as product design changes are made or multiple prototypes are built or in a production or large scale test environment.

Still another technique employs a so-called test executive. A test executive is a program that can control the execution of tests defined in various software components. These software components are in effect small test programs themselves which are activated as needed by the test executive. As products and test strategies evolve, new test components can be added to those that the test executive can execute, and existing test components can be modified as needed. While test executives are more flexible than test programs, they can be more complicated and more involved than the typical user would like.

There are a number of test executives which have been marketed by various companies. Agilent Technologies TestExecSL and FTM-300, National Instrument's TestStand, and Fluke's Spectrum are a few examples. These and other test executive products employ a single sequencing engine to perform the sequencing of tests defined by the user. A consistent problem which these test executives suffer from is that the capabilities of the sequencer are inadequate for some users and much too complex for others. As a result, users have to either settle for less capability than they want or deal with features and capabilities they don't need and don't understand. Since some users may have strong feelings about what capabilities are needed and what capabilities are not needed, those users will find the test executive for their application to be less than optimal.

As with most systems that operate in dynamic environments and that are capable of evolving to meet the challenges of their ever changing environments, test executives tend to have new and modified capabilities added continually. As these features are added, the test executive tends to become more and more complex over time. Most of these additions are visible to the user when they are added as they are then available for use. However, these new features are usually added universally to the user base which is a problem for many users as they will not have a need for the additional functionality. For many users adding new features can be a point of confusion and frustration. In many cases the new features are items that the user does not need and does not wish to be bothered with. At best, users will need to know enough to ignore the new features they don't need. At worst they may need to know how to keep the new features from interfering with their own programs and test sequences. In addition, the only organization that can add these enhancements is the company that provided the test executive. A system integrator who wants to enhance the capabilities of the basic test executive for their customers to add extensions of their own that might provide better service for their particular customer base cannot easily add such capabilities.

SUMMARY

In representative embodiments, a test sequencer software application and method for management and execution of sequence items is disclosed. The test sequencer includes a management module and an execution module. The management module has capabilities of obtaining multiple sequence items definitions, of obtaining configuration information, of creating multiple lists of ordered sequence items from the sequence items definitions, and of separately linking each list of sequence items to one of multiple sequence engines from the configuration information. The execution module includes a sequencer controller module and the multiple sequence engines. The sequence controller module activates each of the multiple sequence engines in a preselected order and each sequence engine executes the ordered sequence items in each list linked to that sequence engine.

In other representative embodiments, a method for activating and executing a sequence of items by a test sequencer software application is disclosed. The method comprises obtaining multiple sequence items definitions, obtaining configuration information, creating multiple lists of ordered sequence items from the sequence items definitions, linking separately each list of sequence items to one of multiple sequence engines from the configuration information, activating each of the multiple sequence engines in a preselected order, and executing by each sequence engine the ordered sequence items in each list linked to that sequence engine. The activation in the step activating each of the multiple sequence engines in a preselected order is effected by a sequence controller module.

Other aspects and advantages of the representative embodiments presented herein will become apparent from the following detailed description, taken in conjunction with the accompanying drawings.

BRIEF DESCRIPTION OF THE DRAWINGS

The accompanying drawings provide visual representations which will be used to more fully describe various representative embodiments and can be used by those skilled in the art to better understand them and their inherent advantages. In these drawings, like reference numerals identify corresponding elements.

DETAILED DESCRIPTION

As shown in the drawings for purposes of illustration, a new extensible and scalable test and measurement sequencer is disclosed in various representative embodiments. These embodiments provide capabilities for the addition of new capabilities and the removal of capabilities deemed unnecessary by a particular user or groups of users. These changes can be effected with relative ease and provide the present test and measurement sequencer with the ability to circumvent the tendency of previous sequencers to become more and more complex with time via effective customization of the sequencer.

In the following detailed description and in the several figures of the drawings, like elements are identified with like reference numerals.

In implementations of representative embodiments, test and measurement sequence tests can be prepared without resorting to writing code in a traditional programming language. The techniques used permit both the extension of and/or the restriction of the capabilities of sequencers as disclosed herein.

In representative embodiments, the sequencer as disclosed herein can be easily extended by the sequencer provider, a system integrator, or by the user to incorporate new sequencing capabilities. An example of such new sequencing capabilities could include the ability of the sequencer to perform sequencing operations in parallel or on the occurrence of a particular event. The sequencer can be easily scaled back to remove sequencing capabilities not needed by the user. Such examples might include the removal of "for . . . loop" sequencing capability and/or removal of "if . . . then . . . else" sequencing capability for those applications wherein only simple ordered execution is required.

In representative embodiments, the sequencing runtime is divided into two parts: the management of the sequences defined by the user, a system integrator, and/or the provider of the test executive and the execution of those sequences. Sequence management is responsible for preparing sequences for execution, but it has no knowledge of exactly what the execution order of those sequences will be. The execution order is determined by one or more sequence execution engines. These sequence execution engines know how to execute one or more lists of sequence items presented to them, but do not know how to create those lists. Sequence definitions specify not only lists of sequence items, but also the sequence execution engine to be used with those lists.

As a result of this architecture, a sequencing application can be extended by writing additional sequencing execution engines that perform new types of sequencing operations on their lists. Writing a sequencing execution engine is far simpler than writing an entire sequencer, as it only has to deal with the execution order of its sequence items, not the mechanics of how those items are defined, managed, or converted in to executable objects.

Further, the sequencing application can by simplified by restricting the types of sequencing execution engines that users have access to in the application user interface. This makes it possible for the sequencer product to be tailored for a particular customer so that only the capabilities they need are visible in the sequencer application, thus eliminating the complexity that they don't need and hence don't need to understand.

Figure 1:
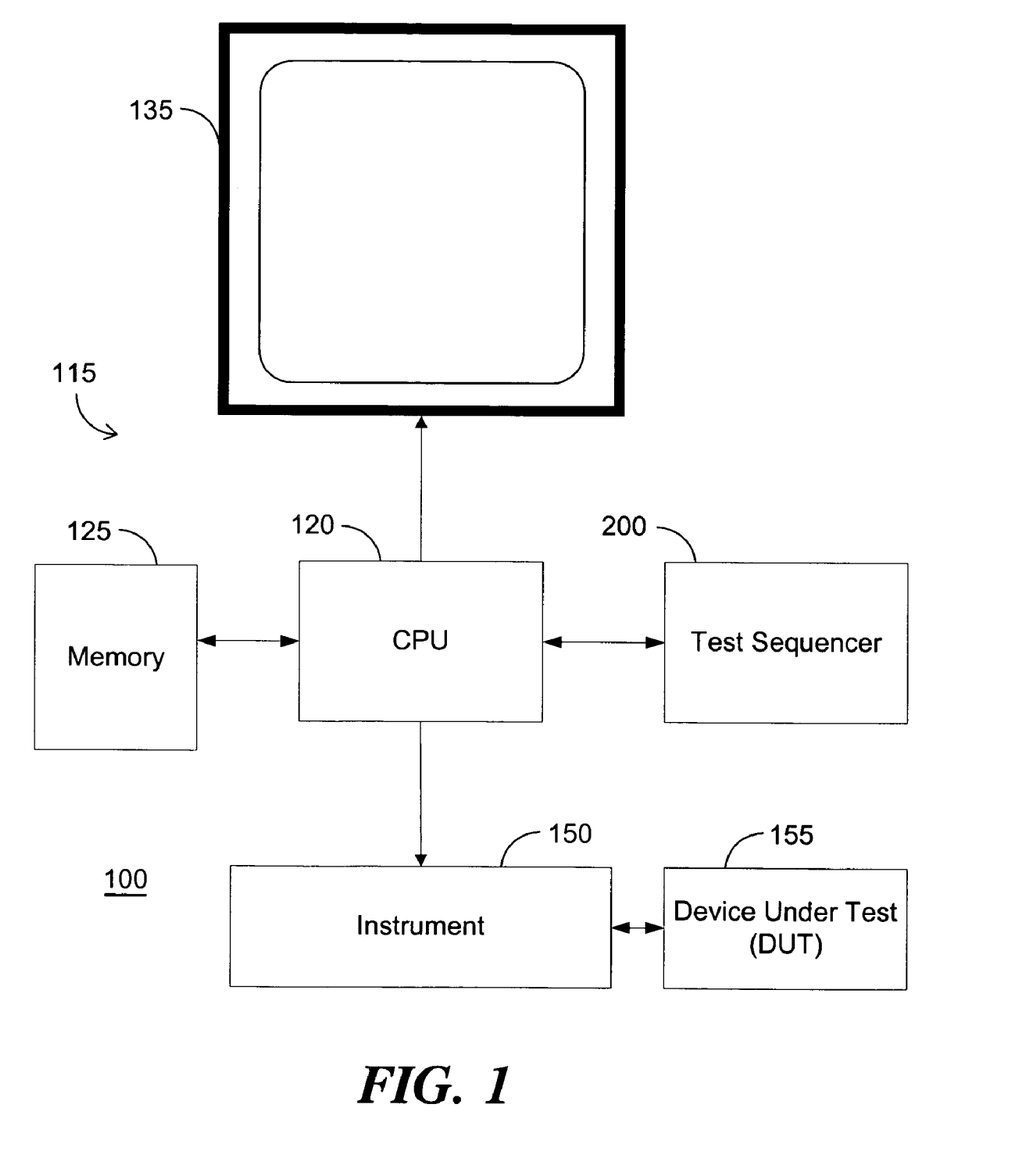
FIG. 1 is a drawing of a block diagram of a measurement system as described in various representative embodiments.

FIG. 1 is a drawing of a block diagram of a measurement system 100 as described in various representative embodiments. In FIG. 1, a computer 115 comprises a central processing unit (CPU) 120, a memory 125, and a monitor 135. In a representative embodiment of a test configuration, a test sequencer software program 200, also referred to herein as a test sequencer software application 200 and as a test sequencer 200, operating on the computer 115 communicates with an instrument 150 which performs measurements on a device under test (DUT) 155 under defined measurement conditions. The test conditions and measurement results can be collected and stored by various means including, but not limited to, storage in a file on the computer 115.

Figure 2:
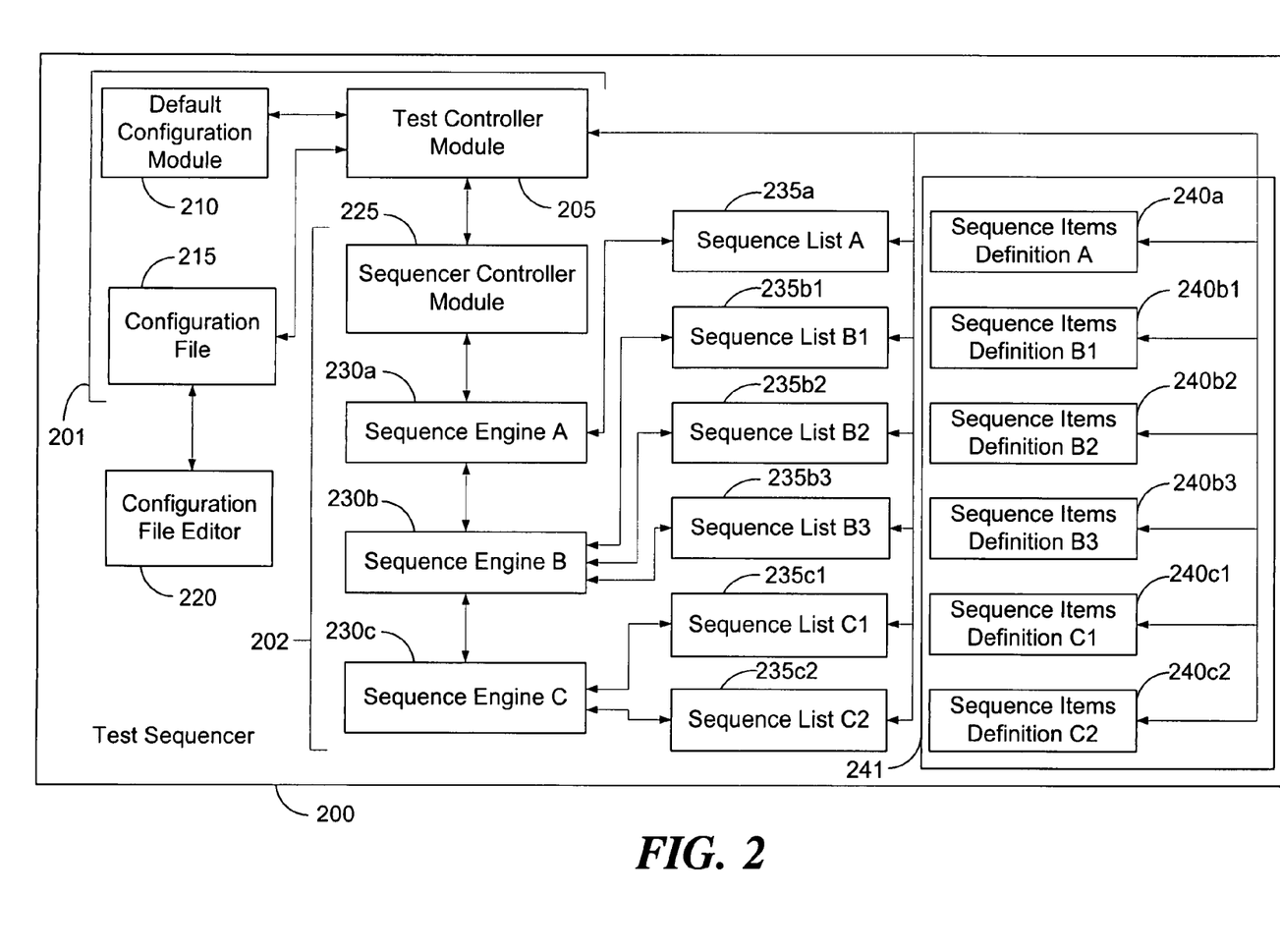
FIG. 2 is a drawing of a block diagram of a test sequencer software program as described in various representative embodiments.

FIG. 2 is a drawing of a block diagram of the test sequencer software program 200 as described in various representative embodiments. In FIG. 2, the test sequencer 200 comprises a management module 201 and an execution module 202. The management module 201 comprises a test controller module 205, a default configuration module 210, and a configuration file 215. The execution module 202 comprises a sequencer controller module 225 and a number of sequence engines which are collectively referred to as sequence engines 230. In the representative embodiment of FIG. 2, the test sequencer 200 further comprises a configuration file editor 220. The following discussion will refer to the configuration file 215 but alternatively more generally means any non-programmatic data store 215 as, for example, a database.

As mentioned above the execution module 202 comprises a number of sequence engines which are collectively referred to as sequence engines 230. In the representative embodiment of FIG. 2 there are three such sequence engines 230 which are identified as sequence engine A 230a, sequence engine B 230b, and sequence engine C 230c. However, the number of sequence engines 230 can be adjusted to fit the need of the test and measurement application.

Further in FIG. 2, the sequence engines 230 are each linked to a number of sequence lists which are collectively referred to as sequence lists 235. In the representative embodiment of FIG. 2, sequence engine A 230a is linked to a single sequence list 235 which is identified as sequence list A 235a. Sequence engine B 230b is linked to three sequence lists 235 which are identified as sequence list B1 235b1, sequence list B2 235b2, and sequence list B3 235b3. Sequence engine C 230c is linked to two sequence lists 235 which are identified as sequence list C1 235c1 and sequence list C2 235c2. Note that the number of sequence lists 235 linked to each sequence engine 230 can be adjusted to fit the need of the test and measurement application.

As stated above in representative embodiments, the sequencing runtime is divided into two parts. The first of these parts is the management of the sequences defined by the user, a system integrator, and/or the provider of the test sequencer 200. Those user defined sequences can be separated into a number of individual blocks and are collectively referred to as sequence items definitions 240. The sequence items definitions 240 can be combined into a test sequence definition file 241 as shown in FIG. 2. When the test sequencer software application 200 is run, the test controller module 205, perhaps via another module not shown in FIG. 2, begins to set itself up for running by first using the configuration information found in the default configuration module 210. The default configuration module 210 could be a file stored in the computer memory 125, coded into the test sequencer software application 200, or available via other appropriate means.

The test controller module 205, again perhaps via another module not shown in FIG. 2, then continues setting itself up for running by accessing the configuration Information found in the configuration file 215. Absence of the configuration file 215 could indicate to the test controller module 205 that the configuration for running the test sequencer is that found in the default configuration module 210 which could indicate that the test sequencer 200 comprises only one sequence engine 230 which could be, for example, sequence engine A 230a and only one sequence list 235 which could be, for example, sequence list A 235a in its default configuration.

Regardless, once the test controller module 205 has obtained the necessary configuration information, it accesses each of the sequence items definitions 240 of which it now has knowledge of via information in the default configuration module 210 and the configuration file 215 and creates the associated sequence lists 235. In particular, the test controller module 205 creates sequence list A 235a from information in the sequence items definition A 240a ; the test controller module 205 creates sequence list B1 235b1 from information in the sequence items definition B1 240b 1; the test controller module 205 creates sequence list B2 235b2 from information in the sequence items definition B2 240b2; the test controller module 205 creates sequence list B3 23b3a from information in the sequence items definition B3 240b3; the test controller module 205 creates sequence list C1 235c1 from information in the sequence items definition C1 240c1; and the test controller module 205 creates sequence list C2 235c2 from information in the sequence items definition C2 240c2.

Figure 3A:
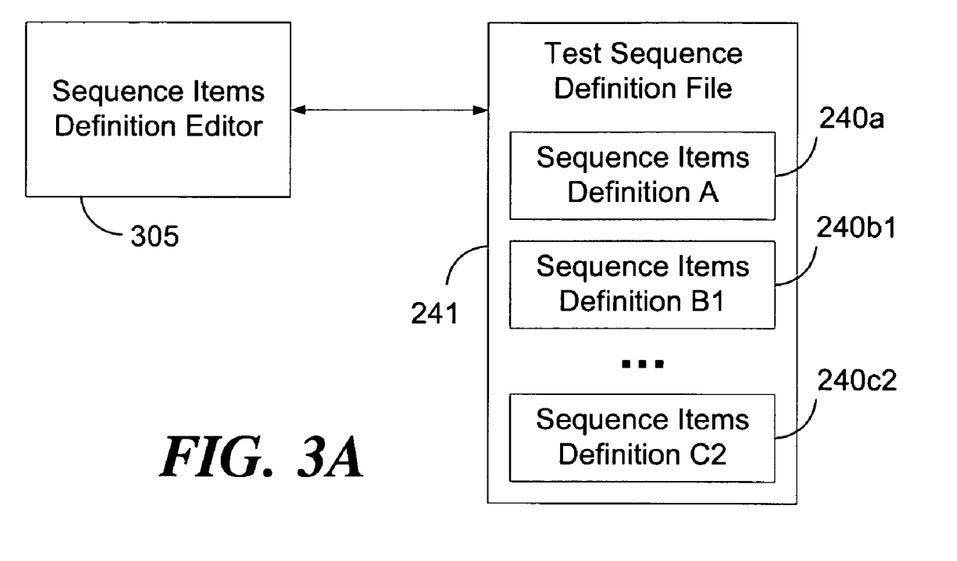
FIG. 3A is a drawing of a block diagram of an editor for creation and modification of sequence items definitions as described in various representative embodiments.

FIG. 3A is a drawing of a block diagram of an editor for creation and modification of sequence items definitions 240 as described in various representative embodiments. In the representative embodiment of FIG. 2, a sequence items definition editor 305 has capability of creating and modifying sequence items definitions 240. Each sequence items definition 240 can be supplied with its own unique sequence items definition editor 305. In the representative embodiments of FIG. 2 and FIG. 3A, the various sequence items definitions 240 are combined into the test sequence definition file 241. The sequence items definition editor 305 associated with a particular sequence items definition 240 can be configured to control the parameters and/or properties of sequence items in that sequence items definition 240. Using such a tailored sequence items definition editor 305, the creator or writer of a set of sequence item definitions can ensure that a subsequent user is limited to parameter values and properties that the writer specifies as being reasonable. The sequence items definition editor 305 would allow the user to insert only certain commands and/or parameters of certain values and/or ranges. The creator or writer of the editor can also present the sequence item control parameters in a more intuitive or natural way than a generic editor might. The editor provides for specific user interface behavior associated with that sequence item definition that is appropriate for it in terms of the user interacting with it. For example, if the user wants to insert a new For-loop sequence, the sequence items definition editor 305 may limit the loop to between 1 and 10 times. The sequence items definition editor 305 will enforce that the user does not enter 15 times for repeating the loop. In another example, if a special command sequence is specified by the user, the sequence items definition editor 305 can be set up to display only sequence items that can be successfully called from that special command. In either of the above cases, the creator of the sequence items definition editor 305 provides some boundaries on what users can do as well as presenting the parameters users can control in an understandable, intuitive way.

Figure 3B:
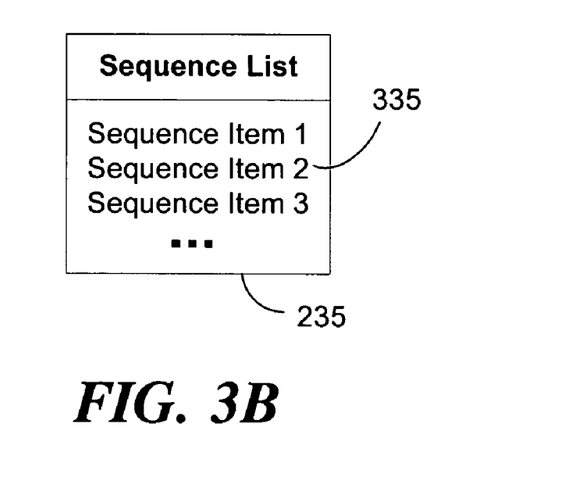
FIG. 3B is a drawing of a block diagram of a sequence list as described in various representative embodiments.

FIG. 3B is a drawing of a block diagram of sequence list 235 as described in various representative embodiments. A number of sequence items 335 are shown in the sequence list 235 of FIG. 3B. For illustrative purposes, however, only one of the three sequence items 335 in FIG. 3B is explicitly shown with an identifying number.

Figure 4A:
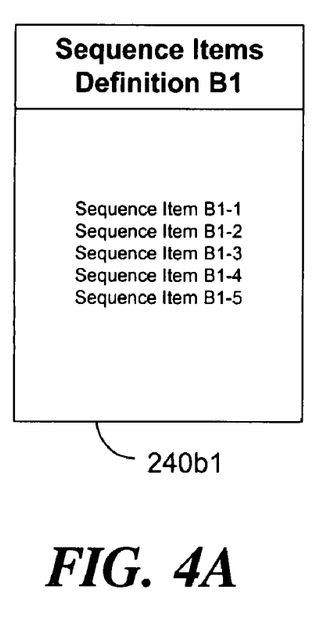
FIG. 4A is a drawing of a representative sequence items definition as described in various representative embodiments.

FIG. 4A is a drawing of a representative sequence items definition 240 as described in various representative embodiments. In the representative embodiment of FIG. 4A, the sequence items definition 240 shown is the sequence items definition B1 240b1 of FIG. 2 and comprises a linear list of sequence items 405, indicated in FIG. 4A as sequence item B1-1 through sequence item B1-5, to be performed by the test sequencer 200.

Figure 4B:
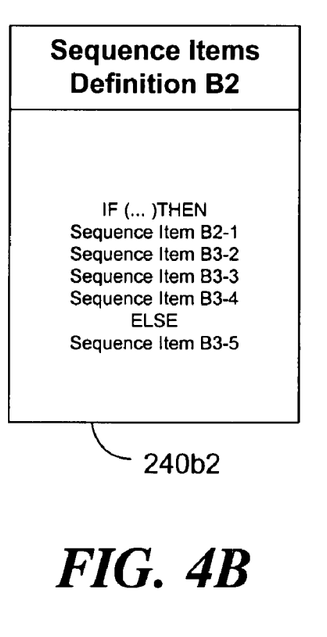
FIG. 4B is a drawing of another representative sequence items definition as described in various representative embodiments.

FIG. 4B is a drawing of another representative sequence items definition 240 as described in various representative embodiments. In the representative embodiment of FIG. 4B, the sequence items definition 240 shown is the sequence items definition B2 240b2 of FIG. 2 and comprises an if . . . then . . . else sequence construct with sequence item B2-1 through sequence item B2-4 to be performed by the test sequencer 200 if the condition in the if . . . then construct is met, otherwise sequence items in the "else" part of the construct (i.e., sequence item B3-5) are performed.

Figure 4C:
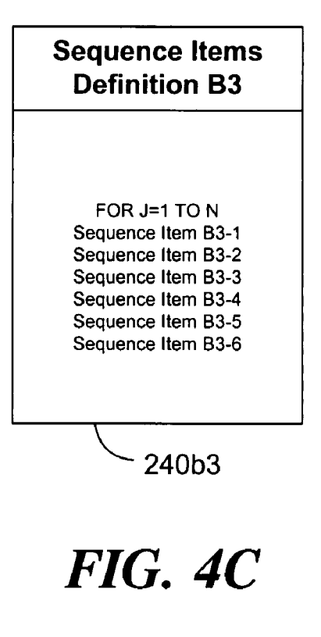
FIG. 4C is a drawing of still another representative sequence items definition as described in various representative embodiments.

FIG. 4C is a drawing of still another representative sequence items definition 240 as described in various representative embodiments. In the representative embodiment of FIG. 4C, the sequence items definition 240 shown is the sequence items definition B3 240b3 of FIG. 2 and comprises a for . . . loop sequence construct with sequence item B3-1 through sequence item B3-6 to be performed N times by the test sequencer 200.

Figure 5:
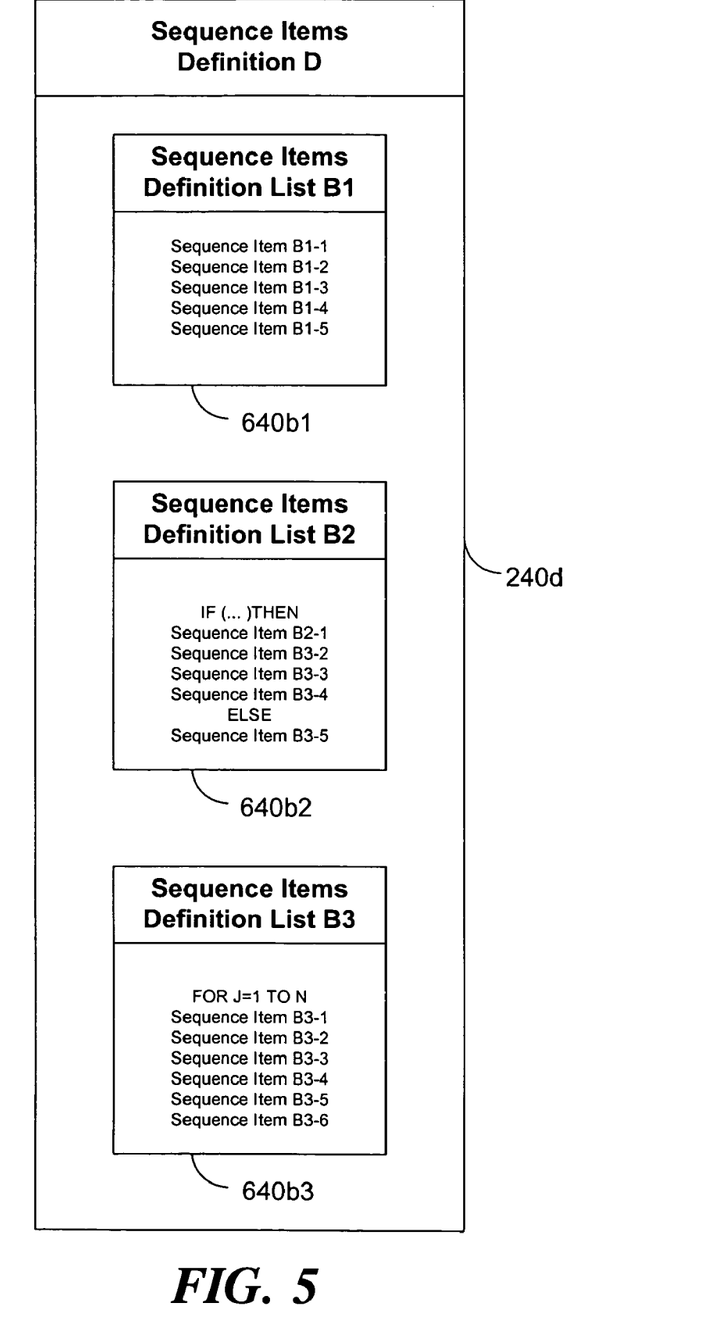
FIG. 5 is a drawing of yet another representative sequence items definition as described in various representative embodiments.

FIG. 5 is a drawing of yet another representative sequence items definition 240 as described in various representative embodiments. In the representative embodiment of FIG. 5, the sequence items definition 240 shown is a new sequence items definition D 240d. The sequence items definition D 240d comprises the linear list of items from the sequence items definition B1 240b1, indicated in FIG. 5 as sequence items definition list B1 640b1, the if . . . then . . . else list of items from the sequence items definition B2 240b2, indicated in FIG. 5 as sequence items definition list B2 640b2, and the for . . . loop list of items from the sequence items definition B3 240b3, indicated in FIG. 5 as sequence items definition list B3 640b3. Thus in an alternative embodiment, the definitions of sequence items from one sequence items definition 240 can be combined with definitions of sequence items from another sequence items definition 240 to form a new sequence items definition 240. In alternative embodiments, the contents of one or more sequence items definitions 240 contained within another sequence items definition 240 resulting in the execution of sequence items of effectively one or more sequence lists 235 within another sequence list 235. The sequence items definition D 240*d* could itself become a part of another sequence items definition 240 or could be stored in the test sequence definition file 241.

Figure 6:
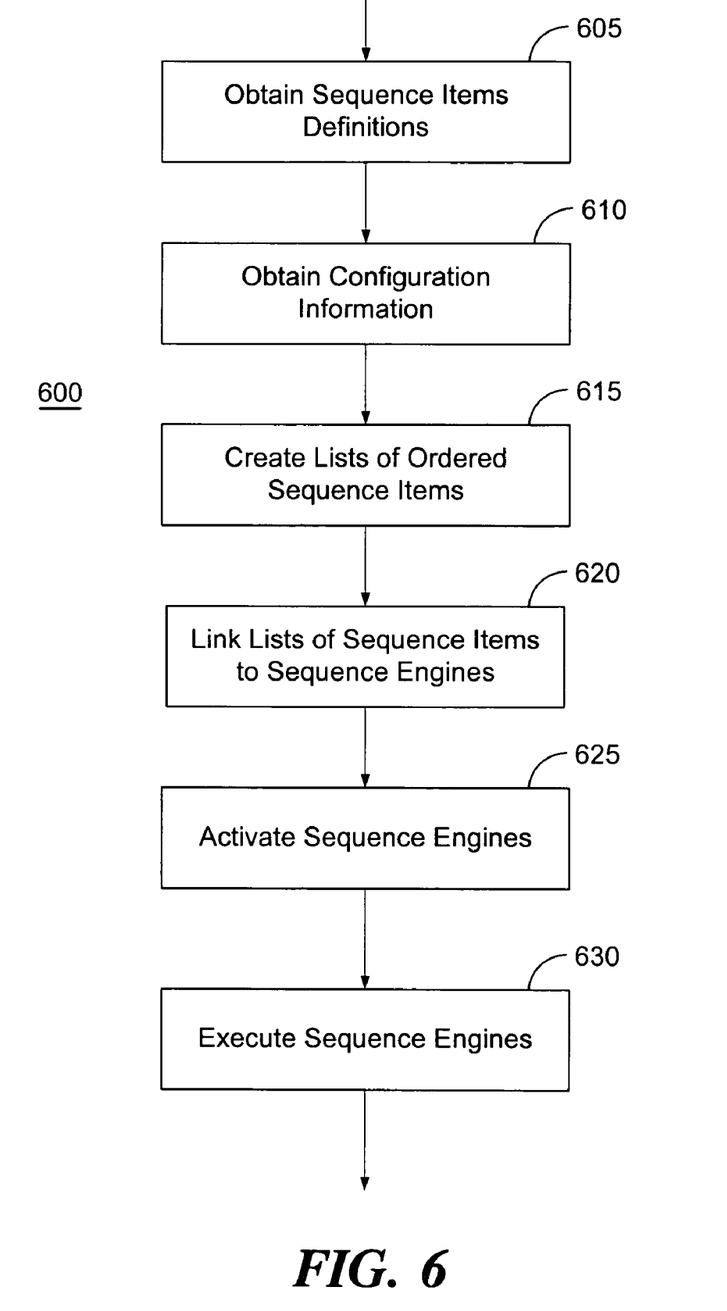
FIG. 6 is a drawing of a flow chart of a method for managing and executing a sequence of items as described in various representative embodiments.

FIG. 6 is a drawing of a flow chart of a method 800 for managing and executing a sequence of items 335 as described in various representative embodiments. In block 605 of FIG. 6, multiple sequence items definitions 240 are obtained. Block 605 then transfers control to block 610.

In block 610, configuration information is obtained. Block 610 then transfers control to block 615.

In block 615, multiple lists 235 of ordered sequence items 335 are created from the sequence items definitions 240. Block 615 then transfers control to block 620.

In block 620, each list 235 of sequence items 335 are linked separately to one of multiple sequence engines 230 from the configuration information. Block 620 then transfers control to block 625.

In block 625, each of the multiple sequence engines 230 is activated in a preselected order, wherein the activation is effected by a sequence controller module 225. Block 625 then transfers control to block 630.

In block 630, each sequence engine 230 executes the ordered sequence items 335 in each list 235 linked to that sequence engine 230.

Again as stated above in representative embodiments, the sequencing runtime is divided into two parts. The second of these parts is the execution of the sequences defined by the user, a system integrator, and/or the provider of the test sequencer 200. Once the sequence lists 235 have been created by the test controller module 205, control is passed to the sequence controller module 225 for execution of the sequences in the sequence lists 235. The sequence controller module 225 calls the sequence engines 230 of which it has knowledge which in the embodiment of FIG. 2 are sequence engine A 230*a*, sequence engine B 230*b*, and sequence engine C 230*c*. Each of these sequence engines 230 in turn executes the sequence items in its associated sequence list 235.

One part of the basic framework of the test sequencer 200 first creates and organizes the items to be sequenced. The another part of the test sequencer 200 via a number of sequence engines 230 makes the necessary calls to perform these sequence items. Using a number of sequence engines 230 to execute the sequence items in the various sequence items definition lists 640 provides flexibility in determining what capabilities are provided to any given user and enables the customization of those capabilities for that customer. Sequencing capabilities can be customized for a group of customers by system integrators or others who can create tests that are application specific. Specifically designed tests, for example, for cell phone manufacturers can be provided by the supplier of the test sequencer 200 as a package to those cell phone manufacturers but not to other users. The end user can then select from those tests which are appropriate and provide parametric values applicable to the product under tests to design and create product specific tests. This customization is effected through the use of multiple sequence engines 230 having multiple sequence lists 235 consisting of multiple sequence item types, all of which is set up via the configuration file 215 which can be an ASCII file that tells the test sequencer 200 the sequence engine and sequence item building blocks that can be used for constructing an overall sequence definition. The test sequencer 200 tells the sequencer control module 225 what types of sequence engines 230 and sequence item types can be used in a sequence. Each of those sequence engines 230 and sequence item types can have an editor, can have a definition object, can have a run time object, that defines how it works. These items are specified as part of the configuration file 215.

Configuration information found in the configuration file 215 or more generally in the non-programmatic data store 215 comprises information identifying the allowed/supported sequence engines 230 and the sequence item 335 types. Definition information includes definitions of the sequence items 335, the sequence items definition 240 containing them, and sequence engines 230 containing those lists. In a representative embodiment, these two information sources differ. The first comprises configuration information of which there is typically one per test sequencer application 200 instance, and the second comprises sequence definition information, of which there maybe many. A sequence items definition 240 may contain multiple sequence items 335 of a given type, each with a definition describing the parameter settings for that instance of the sequence item type. Configuration regarding the types of sequence engines 230 and sequence item 335 types is typically configured at start up, but need not be. The sequence definition for a particular test sequence is not typically obtained at startup, as the user wants the capability of loading one of several such test sequence definitions, run it, then load another test sequence definitions, and subsequently run that test sequence definition, and so on.

Sequence item definitions can be stored in separate files. However, they could be stored as part of overall test sequence definition files one of which is shown in FIG. 3A. There can be levels of hierarchy with the test sequence definition consisting of one or more sequence engine definitions consisting of one or more sequence item lists and other engine parameter settings, with each sequence item list consisting of one or more sequence item definitions.

The standard built-in sequence engines 230 that are provided with the test sequencer 200 by its supplier could include an if . . . then . . . else type of sequence engine that has two sequence lists 235 which are obtained from two sequence items definitions 240, one for the if . . . then part and one for the else part. Other standard built-in sequence engines 230 could also include the for . . . loop construct, a serial construct that executes its sequence items in order one after the other. An effective parallel sequence construct is also possible wherein the sequence items are started in parallel and all must complete before execution proceeds to the next sequencing operation.

The capabilities of the test sequencer 200 can be extended relatively easily even after the test sequencer 200 has been shipped to the customer by defining new sequence engines 230 with new sequence items definitions 240 then changing the configuration file 215 so that the test sequencer 200 knows that the new capabilities are available to it. Capabilities can also be easily removed by removal of the knowledge of those capabilities from the configuration file 215 and then removal of the appropriate sequence engines 230 and sequence items definitions 240.

The capabilities of the test sequencer 200 can be extended by either the addition of new sequence engines 230 or by the addition of new sequence items via the sequence items definitions 240. This level of extensibility enables application specific test sequencers 200. For the cell phone product mentioned above, a test sequencer 200 could be crafted specifically for that application from the test sequencer 200 provided by its manufacturer. Sequence items that know how to do each of the different types of standard cell phone tests can be created and inserted into the sequences to be executed. In representative embodiments disclosed herein, a particular test sequencer or a particular group of test sequencers 200 can be tuned for a particular application area or for testing a particular type of product.

As is the case in many data-processing products, the systems described above may be implemented as a combination of hardware and software components. Moreover, the functionality required for use of the representative embodiments may be embodied in computer-readable media (such as floppy disks, conventional hard disks, DVD's, CD-ROM's, Flash ROM's, nonvolatile ROM, and RAM) to be used in programming an information-processing apparatus (e.g., the computer 115 comprising the elements shown in FIG. 1A among others) to perform in accordance with the techniques so described.

The term "program storage medium" is broadly defined herein to include any type of computer memory such as, but not limited to, floppy disks, conventional hard disks, DVD's, CD-ROM's, Flash ROM's, nonvolatile ROM, and RAM.

The computer 115 can be capable of running one or more of any commercially available operating system such as DOS, various versions of Microsoft Windows (Windows 95, 98, Me, 2000, NT, XP, or the like), Apple's MAC OS X, UNIX, Linux, or other suitable operating system.

Advantages of the representative embodiments described herein in the present patent document include the ability to customize the test sequencer 200 so that it can become essentially an application specific test sequencer 200. In addition, it is relatively easy to keep the complexity of the test sequencer 200 from growing over time as is the tendency with prior test executives. System integrators can simplify the application down to the things that a given user or user group needs without the confusion of unneeded capabilities. Extensibility is provided by the ability to add new types of sequence engines and new types of sequence items. Reconfiguration of the test sequencer 200 can be effected without recompiling by changing a text file which could be, for example, an extensible markup language (XML) file.

Prior test executives have a single sequencing engine that typically becomes more and more complicated over time because there is only one sequencing engine which has to have all of the features that all users want. In representative embodiments disclosed herein compartmentalize the sequencing so that there are multiple sequencing engines. Each one of the sequence engines can know how to do a specific type of sequencing job. As a result the application can be easily extended, as well as scaled back.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A computer readable memory device embodying a test sequencer software application executable by a computer to control an instrument that performs corresponding measurements on a device under test, the test sequencer software application comprising a management module and an execution module,
wherein the management module obtains multiple sequence items definitions from a file that is separate from said management module, obtains configuration information for multiple sequence engines included in the execution module, creates multiple lists of ordered sequence items from the sequence items definitions, and links each list of sequence items to one of the multiple sequence engines based on the configuration information; and
wherein the execution module comprising:
a sequencer controller module; and
the multiple sequence engines, wherein the sequence controller module activates each of the multiple sequence engines in a preselected order and wherein each sequence engine executes the ordered sequence items in each list linked to that sequence engine upon being so activated;
wherein the sequence items are test operations that may be performed by the test sequencer to control the instrument that performs corresponding measurements on the device under test; and wherein the sequence items definitions are user-defined sequences of test operations that may be performed by the test sequencer to control the instrument that performs corresponding measurements on the device under test; and wherein each sequence execution engine executes a different list of sequence items.

2. The computer readable memory device as recited in claim 1, wherein capabilities of the test sequencer software application can be modified via the addition, removal, or modification of one or more sequence engines and appropriate modification of the configuration information.

3. The computer readable memory device as recited in claim 1, wherein capabilities of the test sequencer software application can be modified via the addition, removal, or modification of one or more sequence items definitions.

4. The computer readable memory device as recited in claim 1, wherein the multiple sequence items definitions are obtained at runtime, the multiple lists of ordered sequence items are created from the sequence items definitions at runtime, and each list of sequence items are separately linked to one of multiple sequence engines from the configuration information at runtime.

5. The computer readable memory device as recited in claim 1, wherein the sequence controller module and the multiple sequence engines are interpreters.

6. The computer readable memory device as recited in claim 1, wherein the configuration information is obtainable from a non-programmatic data store.

7. The computer readable memory device as recited in claim 1, wherein the multiple sequence items definitions are obtained from a text file by the management module during the startup of the software application.

8. A method for managing and executing a sequence of items by a test sequencer software application executable to control an instrument that performs corresponding measurements on a device under test, the method comprising:
obtaining multiple sequence items definitions;
obtaining configuration information for multiple sequence engines;
creating multiple lists of ordered sequence items from the sequence items definitions;
linking separately each list of sequence items to one of multiple sequence engines from the configuration information;
activating each of the multiple sequence engines in a preselected order, wherein the activation is effected by a sequence controller module; and
executing by each sequence engine the ordered sequence items in each list linked to that sequence engine
wherein the sequence items are test operations that may be performed by the test sequencer to control the instrument that performs corresponding measurements on the device under test; and wherein the sequence items definitions are user-defined sequences of test operations that may be performed by the test sequencer to control the instrument that performs corresponding measurements on the device under test; and wherein each sequence execution engine executes a different list of sequence items.

9. The method as recited in claim 8, further comprising:
adding, removing, or modifying one or more sequence engines from the test sequencer software application; and
modifying appropriately the configuration information.

10. The method as recited in claim 8, further comprising:
adding, removing, or modifying at least one sequence items definition.

11. The method as recited in claim 8, wherein the step of obtaining the multiple sequence items definitions occurs at runtime, the step creating the multiple lists of ordered sequence items from the sequence items definitions occurs at runtime, and the step linking separately each list of sequence items to one of multiple sequence engines from the configuration information occurs at runtime.

12. The method as recited in claim 8, wherein the step of activating each of the multiple sequence engines is effected by the sequence controller module and wherein the sequence controller module and the multiple sequence engines are interpreters.

13. The method as recited in claim 8, wherein the configuration information obtained in the step obtaining configuration information is obtained from a non-programmatic data store.

14. The method as recited in claim 8, wherein the sequence items definitions obtained in the step obtaining multiple sequence items definitions are obtained from a text file by the software application during a startup phase of the method.

15. A computer readable memory device embodying a computer program of instructions executable by a computer for managing and executing a sequence of items by a test sequencer software application to control an instrument that performs corresponding measurements on a device under test, the instructions comprising:
obtaining multiple sequence items definitions from a file on the memory device;
obtaining configuration information for multiple sequence engines included in the software application;
creating multiple lists of ordered sequence items from the sequence items definitions;
linking separately each list of sequence items to one of multiple sequence engines from the configuration information;
activating each of the multiple sequence engines in a preselected order, wherein the activation is effected by a sequence controller module; and
executing by each sequence engine the ordered sequence items in each list linked to that sequence engine;
wherein the sequence items are test operations that may be performed by the test sequencer to control the instrument that performs corresponding measurements on the device under test; and wherein the sequence items definitions are user-defined sequences of test operations that may be performed by the test sequencer to control the instrument that performs corresponding measurements on the device under test; and wherein each sequence execution engine executes a different list of sequence items.

16. The computer readable memory device as recited in claim 15, the instructions further comprising:
adding, removing, or modifying one or more sequence engines from the test sequencer software application; and
modifying appropriately the configuration information.

17. The computer readable memory device as recited in claim 15, the instructions further comprising:
adding, removing, or modifying at least one sequence items definitions.

18. The computer readable memory device as recited in claim 15, wherein the step obtaining the multiple sequence items definitions occurs at runtime, the step creating the multiple lists of ordered sequence items from the sequence items definitions occurs at runtime, and the step linking separately each list of sequence items to one of multiple sequence engines from the configuration information occurs at runtime.

19. The computer readable memory device as recited in claim 15, wherein the step activating each of the multiple sequence engines is effected by the sequence controller module and wherein the sequence controller module and the multiple sequence engines are interpreters.

20. The computer readable memory device as recited in claim 15, wherein the configuration information obtained in the step obtaining configuration information is obtained from a non-programmatic data store.

21. The computer readable memory device as recited in claim 15, wherein the sequence items definitions obtained in the step obtaining multiple sequence items definitions are obtained from a text file.

* * * * *

UNITED STATES PATENT AND TRADEMARK OFFICE
CERTIFICATE OF CORRECTION

| | | |
|---|---|---|
| PATENT NO. | : 8,171,455 B2 | Page 1 of 1 |
| APPLICATION NO. | : 10/917869 | |
| DATED | : May 1, 2012 | |
| INVENTOR(S) | : Thomas R. Fay | |

It is certified that error appears in the above-identified patent and that said Letters Patent is hereby corrected as shown below:

In column 10, line 4, in Claim 1, delete "comprising:" and insert -- comprises: --, therefor.

In column 10, line 35, in Claim 4, delete "are" and insert -- is --, therefor.

In column 10, line 42, in Claim 6, delete "obtainable" and insert -- obtained --, therefor.

In column 10, line 57, in Claim 8, after "of" insert -- the --. (2nd occurrence)

In column 11, line 18, in Claim 11, after "step" insert -- of --.

In column 11, line 20, in Claim 11, after "step" insert -- of --.

In column 11, line 29, in Claim 13, after "step" insert -- of --.

In column 11, line 33, in Claim 14, after "step" insert -- of --.

In column 12, line 26, in Claim 17, delete "definitions." and insert -- definition. --, therefor.

Signed and Sealed this
Nineteenth Day of June, 2012

David J. Kappos
*Director of the United States Patent and Trademark Office*